United States Patent
Yu et al.

(10) Patent No.: US 9,290,066 B2
(45) Date of Patent: Mar. 22, 2016

(54) TPMS SENSOR POSITION INPUT METHOD

(71) Applicant: Cub Elecparts Inc., Fuxing Township, Changhua County (TW)

(72) Inventors: San-Chuan Yu, Fuxing Township, Changhua County (TW); Tsan-Nung Wang, Fuxing Township, Changhua County (TW); Chi-Hung Chen, Fuxing Township, Changhua County (TW); Chao-Ching Hu, Tainan (TW)

(73) Assignee: Cub Elecparts Inc., Changhua County (TW)

( * ) Notice: Subject to any disclaimer, the term of this patent is extended or adjusted under 35 U.S.C. 154(b) by 2 days.

(21) Appl. No.: 14/293,552

(22) Filed: Jun. 2, 2014

(65) Prior Publication Data

US 2015/0343858 A1 Dec. 3, 2015

(51) Int. Cl.
*B60C 23/00* (2006.01)
*B60C 23/02* (2006.01)
*B60C 23/04* (2006.01)

(52) U.S. Cl.
CPC ......... *B60C 23/0405* (2013.01); *B60C 23/0408* (2013.01); *B60C 23/0416* (2013.01); *B60C 23/0422* (2013.01); *B60C 23/0433* (2013.01)

(58) Field of Classification Search
CPC ............ B60C 23/0408; B60C 23/0416; B60C 23/0433
USPC .......................... 340/442, 445, 447; 73/146.5
See application file for complete search history.

(56) References Cited

U.S. PATENT DOCUMENTS

| | | | |
|---|---|---|---|
| 6,243,007 B1 * | 6/2001 | McLaughlin et al. | 340/447 |
| 6,414,592 B1 * | 7/2002 | Dixit et al. | 340/447 |
| 2004/0041698 A1 * | 3/2004 | Lin | 340/447 |

* cited by examiner

*Primary Examiner* — John A Tweel, Jr.
(74) *Attorney, Agent, or Firm* — Muncy, Geissler, Olds & Lowe, P.C.

(57) ABSTRACT

A TPMS (tire pressure monitoring system) sensor input method is disclosed and performed by: using a setting tool to read in the ID of the TPMS sensor subject to the set position, and then compiling the ID of the TPMS sensor and the position to be set into a set code, and then transmitting the set code to a receiver host for enabling the receiver host to store the data of the ID of the TPMS sensor and the position of the TPMS sensor.

10 Claims, 2 Drawing Sheets

TPMS SENSOR POSITION INPUT METHOD

BACKGROUND OF THE INVENTION

1. Field of the Invention

The present invention relates to TPMS (tire pressure monitoring system) sensor setting technology and more particularly, to a TPMS (tire pressure monitoring system) sensor position input method.

2. Description of the Related Art

Currently, when setting the positions of TPMS sensors in a vehicle, it is to switch the on-vehicle receiver host to a learning mode, and then to trigger the TPMS sensors subject to the sequence requested by the on-vehicle receiver host, for example, the sequence of right front wheel→left front wheel→right rear wheel→left rear wheel. When the on-vehicle receiver host received a response signal from the first TPMS sensor, it memorizes the ID of the TPMS sensor and its respective position, and then waits for receiving a second response signal. This operation procedure is repeated again and again till the on-vehicle receiver host completed the learning of the positions of all vehicle wheels. For causing the TPMS sensor at each vehicle wheel to provide a signal, it needs to deflate the tire of the vehicle wheel to a level below a predetermined warning threshold pressure value. This operation procedure is complicated. The user needs to deflate the tires of the vehicle wheels of the vehicle one after another, and then to inflate the tires of the vehicle wheels of the vehicle to the normal pressure value one after another after the on-vehicle receiver host finished the learning. Further, this method can simply set the ID and position of each TPMS sensor. It is not applicable to set the warning threshold temperature value, warning threshold pressure value or other warning detection factors. Therefore, there is a strong demand for an improved learning and setting method.

SUMMARY OF THE INVENTION

The present invention has been accomplished under the circumstances in view. It is the main object of the present invention to provide a rapid and simple TPMS sensor position input method, which enables the user to set the position of the vehicle wheel carrying the TPMS sensor without deflating and then inflating the tire of the vehicle wheel.

It is another object of the present invention to provide a TPMS sensor position input method, which enables the user to simultaneously setting the warning threshold temperature values and the warning threshold pressure value when setting the position of the vehicle wheel carrying the TPMS sensor.

To achieve these and other objects of the present invention, a TPMS sensor position input method of the invention includes the step of operating an operating interface of a setting tool to select the position of the vehicle wheel carrying the TPMS sensor, the step of enabling the setting tool to send a trigger signal to trigger the TPMS sensor in the vehicle wheel so that the TPMS sensor can feed back a response signal containing the ID of the TPMS sensor after received the trigger signal, and the step of enabling the setting tool to compile the ID of the TPMS sensor, the selected position and other selected parameters into a set code and to transmit the compiled set code to a receiver host.

Other advantages and features of the present invention will be fully understood by reference to the following specification in conjunction with the accompanying drawings, in which like reference signs denote like components of structure.

DETAILED DESCRIPTION OF THE INVENTION

Figure 1:
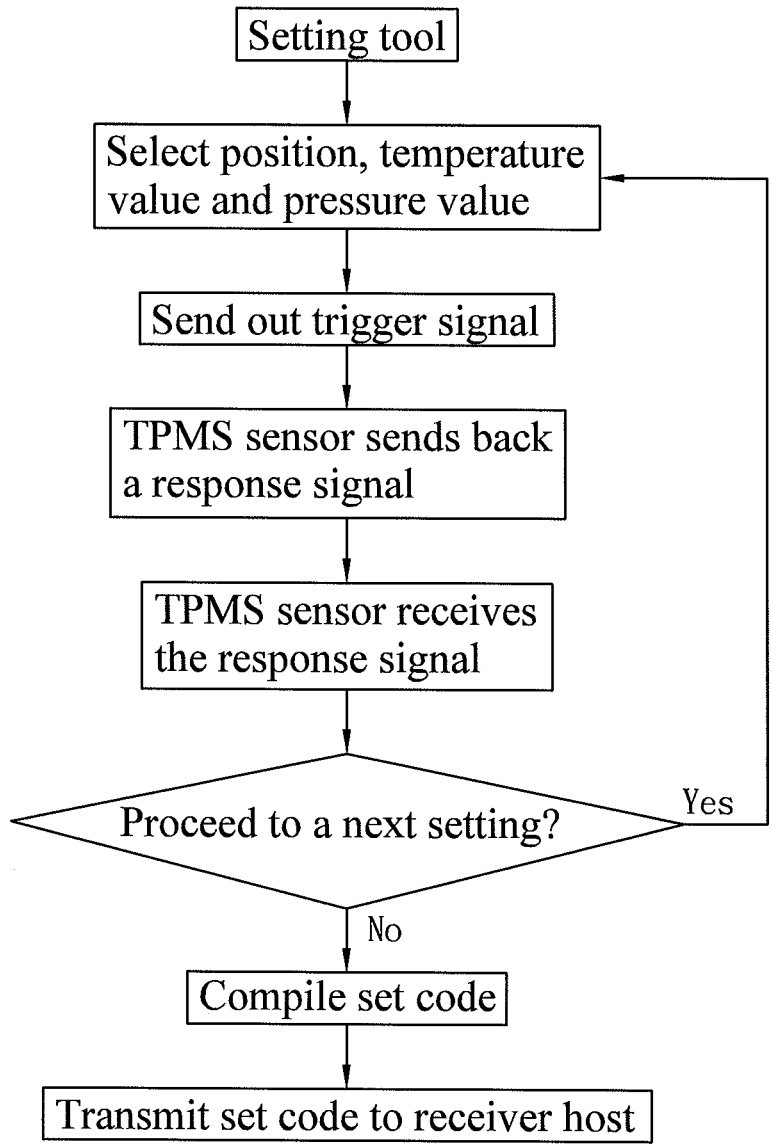
FIG. 1 is an operational flow chart of the setting of the ID and position of the TPMS sensor in accordance with the present invention.
Figure 2:
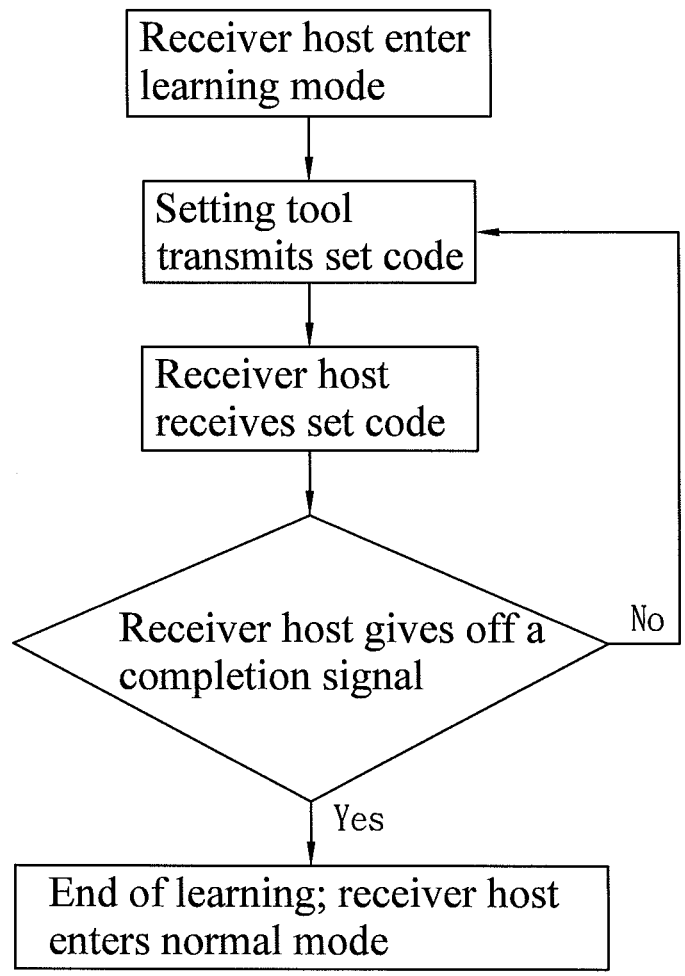
FIG. 2 is an operational flow chart illustrating the operation of the setting tool in the transmission of the set code in accordance with the present invention.

Referring to FIG. 1, a TPMS (tire pressure monitoring system) sensor position input method in accordance with the present invention of the first embodiment comprises the following steps:

A. Provide a setting tool that comprises a microprocessor, a memory, a display interface and an operating interface.

B. Operate the operating interface of the setting tool to select the position, warning threshold temperature value and warning threshold pressure value of the TPMS sensor to be set, for example, left front wheel for the position of the TPMS sensor to be set, 150 for the warning threshold temperature value and 15 psi for the warning threshold pressure value.

C. Approach the setting tool toward the wheel (left front wheel) of the vehicle to be set, and then drive the setting tool to transmit a trigger signal to trigger the TPMS sensor in the wheel of the vehicle.

D. The TPMS sensor feeds back a response signal containing the ID of the TPMS sensor after received the trigger signal.

E. The setting tool stores the ID of the TPMS sensor in the memory thereof after received the response signal from the TPMS sensor.

F. The microprocessor compiles the parameters of the received ID of the TPMS sensor, the selected position into a set code.

Repeat steps B~F till that the respective IDs of all the wheels of the vehicle have been obtained by the setting tool and the ID of each TPMS sensor and the corresponding position have been assigned. For example, repeat steps B~F 4 times if there are 4 wheels of the vehicle to be set. At this time, the setting data including the IDs of the TPMS sensors in these wheels. The microprocessor of the setting tool will then compile the parameters of the received IDs and the selected positions into respective set codes. Because there are 4 wheel positions to be set, the setting tool will compile 4 set codes.

A TPMS (tire pressure monitoring system) sensor position input method in accordance with the present invention of the second embodiment comprises the following steps:

A. Provide a setting tool that comprises a microprocessor, a memory, a display interface and an operating interface.

B. Operate the operating interface of the setting tool to select the position, warning threshold temperature value and warning threshold pressure value of the TPMS sensor to be set, for example, left front wheel for the position of the TPMS sensor to be set, 150 for the warning threshold temperature value and 15 psi for the warning threshold pressure value.

C. Approach the setting tool toward the wheel (left front wheel) of the vehicle to be set, and then drive the setting tool to transmit a trigger signal to trigger the TPMS sensor in the wheel of the vehicle.

D. The TPMS sensor feeds back a response signal containing the ID of the TPMS sensor after received the trigger signal.

E. The setting tool stores the ID of the TPMS sensor in the memory thereof after received the response signal from the TPMS sensor.

F. The microprocessor compiles the parameters of the received ID of the TPMS sensor, the selected position, warning threshold temperature value and warning threshold pressure value of the TPMS sensor into a set code.

Repeat steps B~F till that the respective IDs of all the wheels of the vehicle have been obtained by the setting tool and the ID of each TPMS sensor and the corresponding position have been assigned. For example, repeat steps B~F 4 times if there are 4 wheels of the vehicle to be set. At this time, the setting data including the IDs of the TPMS sensors in these wheels and the related warning threshold temperature value and warning pressure value are obtained by the setting tool and stored in the memory of the setting tool. The microprocessor of the setting tool will then compile the parameters of the received IDs and the selected positions, warning threshold temperature value and warning threshold pressure value into respective set codes. Because there are 4 wheel positions to be set, the setting tool will compile 4 set codes.

There is no sequential restriction on the setting operation of the position, warning threshold temperature value and warning threshold pressure value. The operator can set the warning threshold temperature value, and then set the position, and finally set the warning threshold pressure value. Alternatively, the user can set the warning threshold pressure value, and then set the warning threshold temperature value, and finally set the position.

In application, the operator simply needs to hold the setting tool and walk around the vehicle for one turn, and the setting tool will automatically read in the IDs and related positions of all the TPMS sensors in the wheels of the vehicle.

After the setting tool obtained the related parameters and compiled the set code, the method of inputting the set data into the receiver host is outlined hereinafter:

Set the on-vehicle receiver host into a learning mode.

Enable the setting tool to transmit the set code to the on-vehicle receiver host wirelessly.

The on-vehicle receiver host receives and stores the set code.

The on-vehicle receiver host sends a signal of "Completion" to the setting tool after received the set code, and then turns from the learning mode to the normal mode.

Further, in the aforesaid step of inputting the set code into the on-vehicle receiver host, it is no imperative to input all set codes at a time after the positions and IDs of all TPMS sensors have been obtained. It is allowed to transmit each individual set code to the on-vehicle receiver host as soon as each individual set code is compiled.

The format of the set code transmitted by the setting tool to the on-vehicle receiver host can be determined subject to the format of the receiving program of the on-vehicle receiver host. Alternatively, the format can be any other program format configured for communication between the setting tool and the on-vehicle receiver host.

When an operator sets the ID and position of a TPMS sensor at each wheel of a vehicle in an on-vehicle receiver host in the vehicle subject the method of the present invention, the operator simply needs to operate the setting tool without deflating the tire of the vehicle wheel and then inflating the tire. Further, when setting the ID and position of one TPMS sensor in the on-vehicle receiver host, the warning threshold temperature value and the warning threshold pressure value can also be compiled into the setting. Thus, when compared with the conventional techniques, the invention can achieve the setting more quickly and easily.

What is claimed is:

1. A TPMS (tire pressure monitoring system) sensor position input method, comprising the steps of:

A. providing a setting tool;
B. operating said setting tool to select the position of the TPMS sensor in one wheel of a vehicle to be set;
C. enabling said setting tool to transmit a trigger signal to trigger said TPMS sensor;
D. said TPMS sensor feeding back a response signal containing the ID of said TPMS sensor after receiving said trigger signal;
E. said setting tool compiling said ID of said TPMS sensor, the position selected by the operator into a set code after receiving said response signal from said TPMS sensor, and then transmitting said set code to an on-vehicle receiver host.

2. The TPMS (tire pressure monitoring system) sensor position input method as claimed in claim 1, wherein in step B, operating said setting tool to select the position of the TPMS sensor to be set is to simultaneously select a warning threshold pressure value.

3. The TPMS (tire pressure monitoring system) sensor position input method as claimed in claim 2, wherein in step E, said setting tool compiles said ID of said TPMS sensor and the position and warning threshold pressure value selected by the operator into a set code after receiving said response signal from said TPMS sensor, and then transmits said set code to said on-vehicle receiver host.

4. The TPMS (tire pressure monitoring system) sensor position input method as claimed in claim 1, wherein in step B, operating said setting tool to select the position of the TPMS sensor to be set is to simultaneously select a warning threshold temperature value.

5. The TPMS (tire pressure monitoring system) sensor position input method as claimed in claim 4, wherein in step E, said setting tool compiles said ID of said TPMS sensor and the position and warning threshold temperature value selected by the operator into a set code after receiving said response signal from said TPMS sensor, and then transmits said set code to said on-vehicle receiver host.

6. The TPMS (tire pressure monitoring system) sensor position input method as claimed in claim 1, wherein in step B, operating said setting tool to select the position of the TPMS sensor to be set is to simultaneously select a warning threshold temperature value and a warning threshold pressure value.

7. The TPMS (tire pressure monitoring system) sensor position input method as claimed in claim 6, wherein in step E, said setting tool compiles said ID of said TPMS sensor and the position, warning threshold temperature value and warning threshold pressure value selected by the operator into a set code after receiving said response signal from said TPMS sensor, and then transmits said set code to said on-vehicle receiver host.

8. The TPMS (tire pressure monitoring system) sensor position input method as claimed in claim 1, wherein said setting tool stores the ID of said TPMS sensor after receiving said response signal from said TPMS sensor.

9. The TPMS (tire pressure monitoring system) sensor position input method as claimed in claim 1, wherein said setting tool transmits each individual set code to said on-vehicle receiver host immediately after each individual set code is compiled.

10. The TPMS (tire pressure monitoring system) sensor position input method as claimed in claim 1, wherein said setting tool transmits all set codes for multiple TPMS sensors at different wheels of the vehicle to said on-vehicle receiver host immediately after all the set codes are compiled.

* * * * *